United States Patent [19]

Hoffman

[11] Patent Number: 5,150,335
[45] Date of Patent: Sep. 22, 1992

[54] FREQUENCY INTERRUPT CONTINUOUS TRANSMIT ACTIVE SONAR TRANSMISSION AND SIGNAL PROCESSING TECHNIQUE

[75] Inventor: Scott E. Hoffman, Manlius, N.Y.

[73] Assignee: General Electric Company, Syracuse, N.Y.

[21] Appl. No.: 714,104

[22] Filed: Jun. 11, 1991

[51] Int. Cl.⁵ .............................................. G01S 15/00
[52] U.S. Cl. .................................................... 367/101
[58] Field of Search ................. 367/101, 102, 90, 904, 367/100

[56] References Cited

U.S. PATENT DOCUMENTS 4,282,589  8/1981  Evetts et al. ......................... 367/101

OTHER PUBLICATIONS deRoos et al., "The detector and classification of objects lying on the seafloor", Oct. 1988, J. Acoust. Soc. Am. 84(4), pp. 1456–1477.

Primary Examiner—Daniel T. Pihulic
Attorney, Agent, or Firm—Paul Checkovich; Stephen A. Young

[57] ABSTRACT

In a time continuous transmit active sonar system the frequency of the transmitted waveform is interrupted at predetermined intervals so that a frequency discontinuity in the transmitted waveform occurs at each interruption. The starting and ending frequencies at the beginning and end of the interruptions provide indications for properly resolving the range/Doppler ambiguity that is inherent in prior continuous transmit sonar systems. The transmitted signal may be frequency modulated. Further, the frequency of the transmitted waveform may be rapidly changed and/or multiple frequency waveforms may be transmitted within the same time interval. An existing passive sonar detection system may be modified to include an active continuous transmit sonar system whose echo returns may be processed by the passive system, thereby achieving benefits over conventional active pulsed sonar systems.

15 Claims, 11 Drawing Sheets

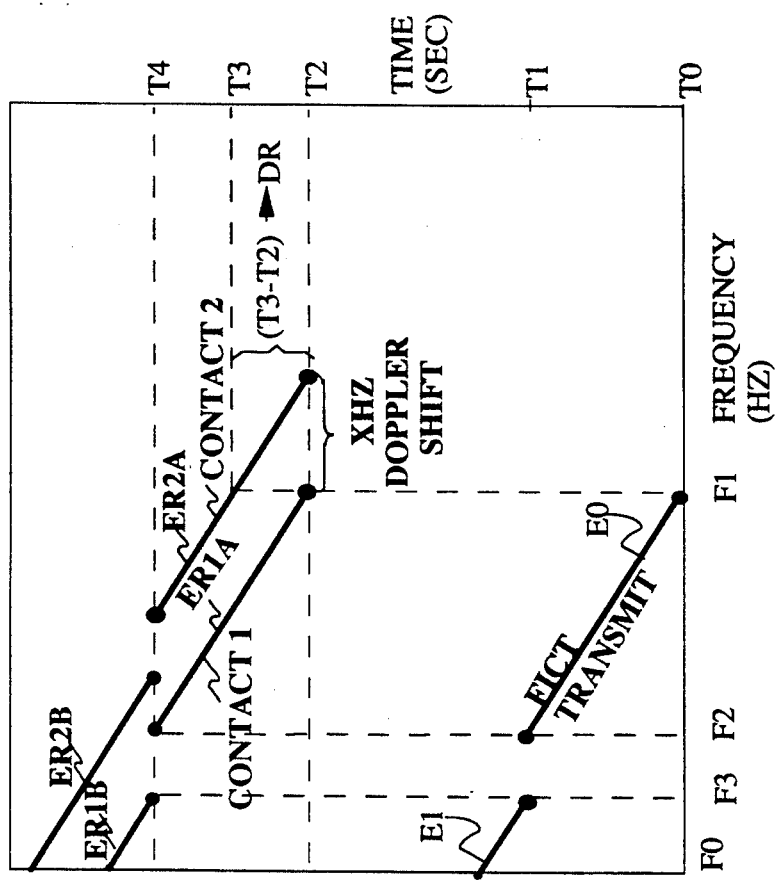
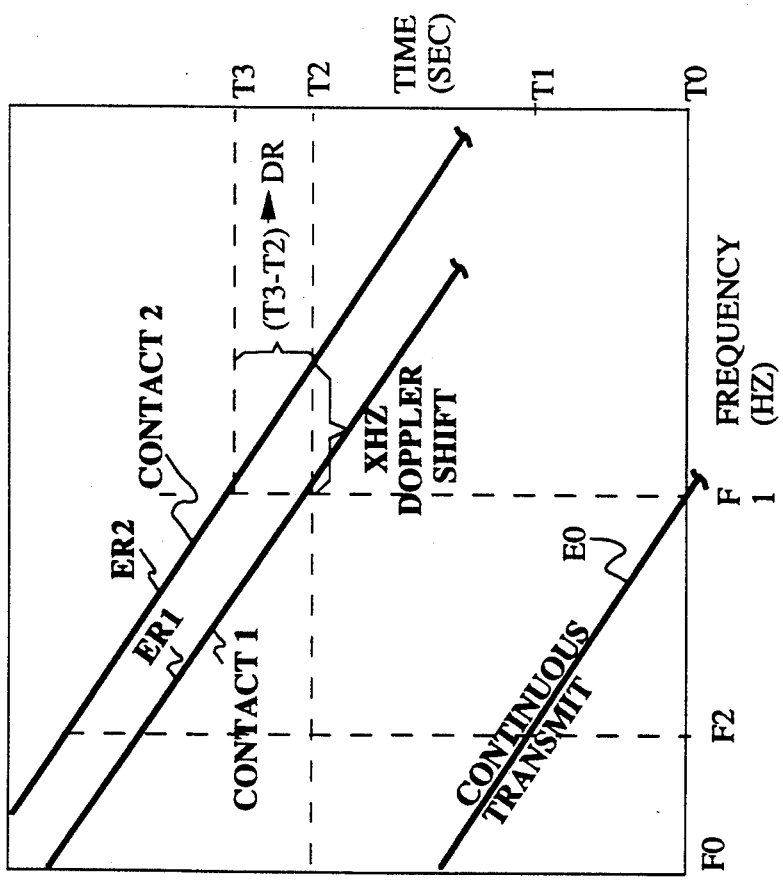

FREQUENCY INTERRUPT CONTINUOUS TRANSMIT ACTIVE SONAR TRANSMISSION AND SIGNAL PROCESSING TECHNIQUE

BACKGROUND OF THE INVENTION

This invention relates to time domain continuous transmit active sonar, and, more particularly, to such sonar wherein the acoustic energy generated by the sonar for coupling into the transmitting medium (typically water) includes predetermined frequency interruptions or discontinuities in the frequency domain, and further wherein processing techniques may be employed for permitting reduction of the amount of acoustic energy required for obtaining equivalent performance with prior active sonar systems.

A basic limitation of a typical active pulsed, or pinging, sonar is that transmission and reception cannot occur simultaneously. For applications where simultaneous transmission and reception are desired, a continuous transmission frequency-modulated sonar such as described in "The Detection and Classification of Objects Lying on the Seafloor"—deRoos et al, *J. Acoust. Soc. Am.* 84(4) (1988) may be used. However, such prior continuous wave systems experience an inherent range Doppler ambiguity phenomenon when only the transmit/receive time and frequency of the return echo are considered.

Further, in the anti-submarine warfare (ASW) arena, arrays of passive acoustic listening devices, such as hydrophones, are often towed by surface ASW ships. The arrays capture acoustic energy incident thereon, convert the acoustic energy to representative electrical signals and supply the resulting electrical signals to the associated ship for processing, such as target detection and tracking. A desired design goal and operational feature of some seagoing vessels including submarines is to achieve totally silent operation, at least while stationary or moving under their own power at a relatively slow speed, say less than about 5 knots. As the operational noise from a potential target vessel is reduced, the effectiveness of the towed arrays in detecting potential targets is decreased.

Inasmuch as towed array passive acoustical systems are widely available, it would be desirable to use the existing arrays and to increase the effectiveness thereof, especially with respect to quieter potential targets, without having to invest in a design of an entire sonar system.

Accordingly, it is an object of the present invention to provide a continuous transmit frequency modulated sonar system, wherein range ambiguities may be readily avoided and/or properly resolved.

Another object of the present invention is to modify or retrofit an existing towed array passive sonar system for increasing its target detection capabilities and providing accurate range determination.

Still another object of the present invention is to provide a continuous transmit frequency modulated sonar system wherein the frequency of the transmitted wave of energy may be rapidly changed while maintaining target detection and accurate range determination.

Yet another object of the present invention is to include a frequency interrupt continuous transmit active sonar in combination with a towed array passive sonar system for increasing target detection capabilities.

SUMMARY OF THE INVENTION

In accordance with the present invention, in a time domain continuous transmit sonar system, a method for generating a time domain continuous transmitted waveform of energy for resolving range/Doppler ambiguity comprises selecting a first frequency for the waveform at the beginning of a first time interval and selecting a second frequency for the waveform at the beginning of a second time interval, wherein the beginning of the second time interval corresponds in time to the end of the first time interval and further wherein the second frequency is different from the first frequency, so that the waveform is discontinuous in the frequency domain at the end of the first and beginning of the second time interval, wherein examination of echo returns from an object in response to the transmitted waveform from both the first and second time interval will permit proper resolution of the range and Doppler shift frequency caused by the object without range/Doppler ambiguity.

The method may further include the steps of modulating the waveform at a first predetermined rate of change of frequency during the first time interval and modulating the waveform at a second predetermined rate of change of frequency during the second time interval. Also, the first and second predetermined rate of change may be equal and one or both may be equal to zero.

In another aspect of the present invention, in combination, an active and passive sonar system comprises transmitter means for coupling time domain continuous acoustic energy into a transmitting medium, detection means for sensing at least a portion of the acoustic energy in the transmitting medium and processing means for processing information indicative of the sensed acoustic energy wherein the transmission means is retrofitted to a passive sonar system including the detection means and the processing means, the combination for increasing the target detection capability of the passive sonar system.

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

BRIEF DESCRIPTION OF THE DRAWING

FIG. 1A is a schematic diagram which illustrates the range/Doppler ambiguity phenomenon of prior continuous transmit frequency modulated sonar systems.

FIG. 1B is a schematic diagram which illustrates proper resolution of range and Doppler in accordance with the present invention.

DETAILED DESCRIPTION

Figure 2A:
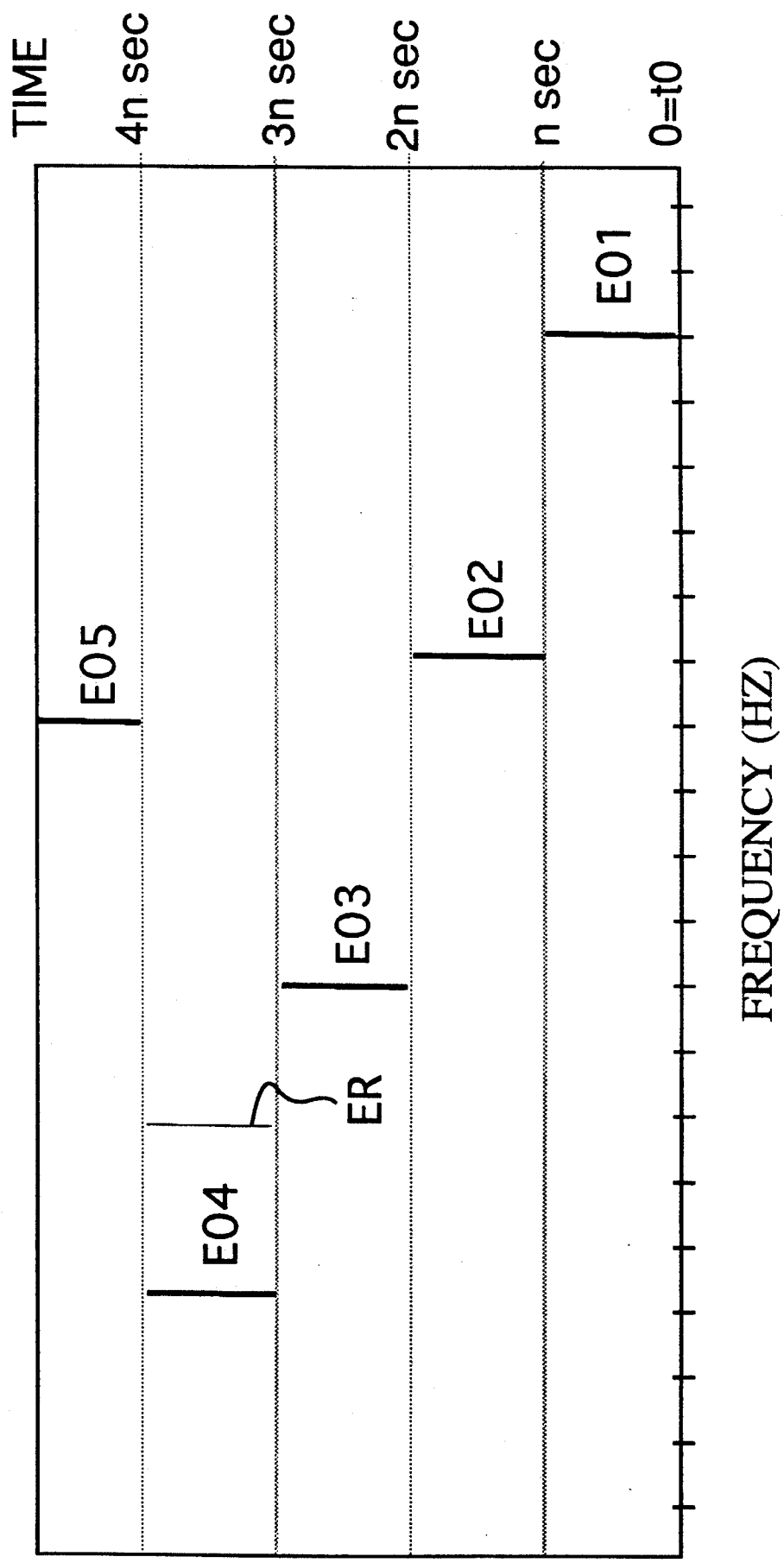
FIGS. 2A and 2B are respective diagrams of a frequency interrupt continuous transmit waveform in accordance with the present invention.

Referring to FIG. 1A, a schematic diagram illustrating the range/Doppler ambiguity phenomenon of prior continuous transmit frequency modulated sonar systems is shown. The vertical axis or ordinate represents time increasing from bottom to top. The horizontal axis or abscissa represents frequency increasing from left to right.

A continuous transmitted wave of acoustic energy is modulated so that its frequency conforms to output energy waveform $E_o$. That is, the acoustic energy is transmitted at frequency $f_1$ at time $t_o$ and linearly decreases in frequency to frequency $f_2$ at time $t_1$. At some later time $t_2$, a return echo $E_{rn}$ of acoustic energy in response to transmitted energy waveform $E_o$ may be received and detected.

Two hypothetical contacts are shown. Contact 1 is a zero Doppler target at range $R_1$. Contact 2 is a 30 Kt (knot) Doppler target at range $R_1$, which may be considered as generating an xHz upward Doppler frequency shift in the detected acoustic signal at time $t_2$ with respect to the frequency return echo $E_{r1}$ of Contact 1. The range ambiguity is readily apparent. For frequency $f_1$ transmission, there are two possible echo returns $E_{r1}$ and $E_{r2}$, the former at time $t_2$ and the latter at time $t_3$. Without more information, it is not possible to determine whether the return at time $t_3$ is actually Contact 2 having a 30 Kt Doppler shift, or some other stationary target having a zero Doppler shift at a range of $R_1 + \Delta R$, wherein $\Delta R$ is a function of both the difference in time $(t_3 - t_2)$ and the speed of sound in the transmitting medium.

Inasmuch as transmission may be continuous, the transmission $E_o$ and return echoes $E_{r1}$ and $E_{r2}$ are shown as continuing from some prior time. This representation does not affect the validity of the range Doppler ambiguity presentation.

Referring to FIG. 1B, a schematic diagram which illustrates proper resolution of range and Doppler in accordance with the present invention is shown. The profiles of Contacts 1 and 2 are the same as in FIG. 1A.

In accordance with the present invention, the frequency interrupt continuous transmit (FICT) waveform is continuous in time but discontinuous in frequency. Thus for the time interval $t_o$ to $t_1$, a portion $E_o$ of the output waveform is modulated to decrease from frequency $f_1$ to frequency $f_2$. At time $t_1$ a new initial starting frequency $f_3$ is selected for the starting frequency of a next portion $E_1$ of the FICT waveform so that the FICT waveform is continuous, or substantially continuous in time, but exhibits a discontinuity in frequency. The effect of the rapid shift in frequency from $f_2$ to $f_3$ is shown in the return echoes from Contacts 1 and 2. Return echoes $E_{r1A}$ and $E_{r1B}$ from stationary Contact 1 in response to transmitted waveforms $E_o$ and $E_1$, respectively, exhibit a discontinuity in frequency at time $t_4$ that is the same size as the discontinuity at time $t_1$ between the ending of portion $E_o$ of the output waveform and the beginning of portion $E_1$ of the output waveform. The frequency discontinuity that is shown occurring between the end of return echo $E_{r2A}$ and the beginning of return echo $E_{r2B}$ is equal to the difference in frequency $f_2 - f_3$ at time $t_1$ for output waveforms $E_o$ and $E_1$. Because segments such as $E_o$ and $E_1$ are intentionally created and have a respective starting and ending frequency in accordance with the present invention, echo returns that are compared at the time corresponding to the beginning and ending of such segments will readily demonstrate whether the contact is stationary (same frequency as transmitted is detected) or moving (transmitted frequency plus or minus Doppler frequency is detected) and also the proper range.

Referring to FIG. 2A, a diagram of a frequency interrupt continuous transmit (FICT) waveform in accordance with the present invention is shown.

For the transmit waveform shown in FIG. 2, no frequency modulation of the output energy signal $E_{om}$ is used. That is, a constant frequency is transmitted, say for example, output energy $E_{o1}$ over the time interval from $t=0$ to $t=n$ seconds. Over the next contiguous time interval $t=n$ to $t=2n$ a different but constant frequency output energy signal $E_{o2}$ is transmitted. A constant frequency, but one different from the frequency of the immediately preceding time interval may be used for each succeeding contiguous time interval. Thus, the frequencies of non-contiguous time intervals, may be the same or different as desired. It is not necessary that the time intervals for transmission be equal, nor that the frequency of transmission during a next time interval $(m+1)$ be in a fixed relationship, say either greater than or less than, with respect to the frequency of the next preceding time interval m. Thus, a random or pseudo random selection may be made for the frequency to be transmitted within a time interval. Of course, the selected frequencies of transmission should be selected so that the frequencies of any expected echo returns will be within the detection and processing capabilities of the sonar system for ensuring efficient operation.

The transmitted waveform shown in FIG. 2A is particularly effective in detecting a target moving at a velocity greater than a predetermined threshold. The threshold is a function of reverberation caused by own ship active acoustic energy transmission and may typically be about 5 Kt. Thus a target that is seeking to avoid detection and that is potentially detectable by the waveform of FIG. 2, is speed limited, and would have to operate under the threshold to avoid such detection. A representative closing target echo $E_R$ is shown at a frequency that exceeds the predetermined threshold and that is displaced from all previous relevant transmitted frequencies.

Figure 2B:
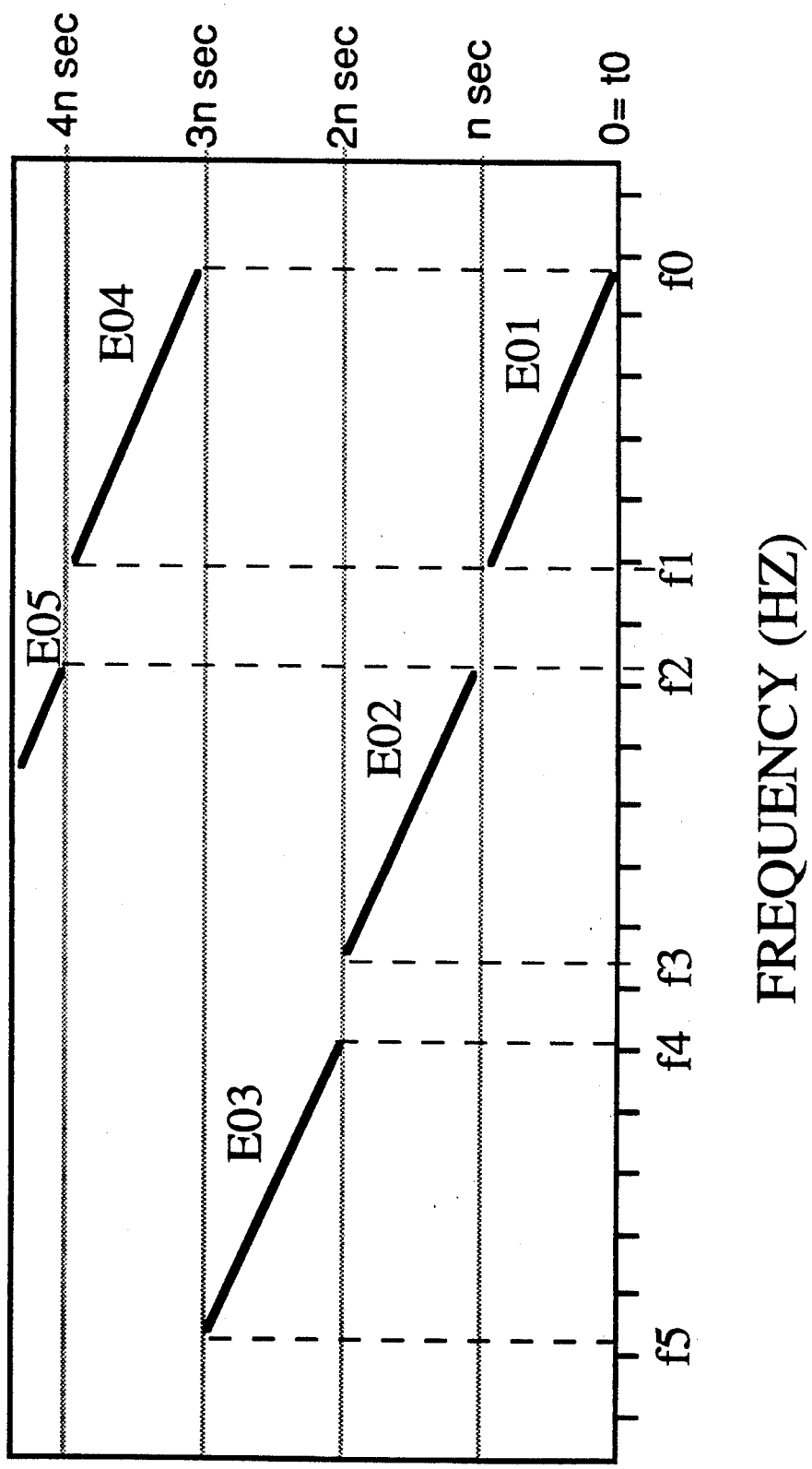

Referring to FIG. 2B, another modulation scheme in accordance with the present invention is shown.

During a first time interval $t=0$ to $t=n$, the output energy waveform $E_{o1}$ starts at initial frequency $f_o$ and is decreasingly linearly monotonically modulated over the first interval to a frequency $f_1$. Although the modulation, or sweep, rate may be selected to be any rate which provides desired target detection efficiency, by way of illustration and not of limitation, a typical rate may be one Hertz per second. That is, during each succeeding second, the transmitted frequency will be one second in duration and different from the transmitted frequency of the next preceding second by 1 Hz. The actual slope or modulation rate selected for efficient operation is a function of own sonar transmission acoustic energy reverberation. A slower modulation rate permits an increase in system gain for target detection for a predetermined time interval of return echo inspection while a faster modulation rate, which may be better applied in a high reverberation environment, requires a longer time for return echo inspection for achieving the same gain as for the slower rate.

At the end of a predetermined time interval, say at $t=n$ for interval $t=n$ minus $t=t_o$, a starting frequency $f_2$ is selected for beginning transmission $E_{o2}$ in a next contiguous time interval $t=2n$ minus $t=n$. Likewise, a starting frequency $f_4$ is selected as the starting frequency for another transmission $E_{o3}$ after termination of the previous interval $t=2n$ minus $t=n$ at frequency $f_3$. For example, frequencies $f_o$ and $f_5$ may be selected to be the respective boundaries of the effective bandwidth of the system.

At the end of transmission $E_{o3}$ at frequency $f_5$, the pattern of transmissions $E_{o1}$, $E_{o2}$ and $E_{o3}$ may be repeated over the next three successive contiguous time intervals so that transmission $E_{o4}$ corresponds to transmission $E_{o1}$, $E_{o5}$ corresponds to transmission $E_{o2}$, etc., but delayed in time by $3n$, or the total time interval of the preceding waveform before repetition. The number of transmissions $E_{om}$ before repetition is not limited to three but may be selected to be any number for m equal to, or greater than, two, subject only to the maximum number being generally desirably restricted to effective transmission, detection and processing bandwidth limitations of the system. For example, if the starting frequencies $f_n$ are selectable in one Hertz increments, then the maximum number for m of transmissions $E_{om}$ before repetition of one of the preceding transmissions $E_{om}$ will generally be the magnitude of the effective bandwidth of the system in Hertz.

From FIGS. 2A and 2B, it is noted that the output energy transmissions $E_{om}$ are continuous in time but include a frequency discontinuity or interrupt at the end of predetermined time intervals and beginning of the next succeeding time interval. The predetermined time intervals are typically selected to be less than the entire effective bandwidth of the system. Further, the magnitude of the frequency interrupt is typically selected to be at least about 10 Hz in response to the desired detection range and range resolution. It is not necessary that all transmission time intervals be of the same length. However, an optimum length that may be used for all intervals may be determined by one of ordinary skill in the art without undue experimentation based on criteria such as sonar detection theory, including integration time available for echo return processing, response to threat time required and expected amount of improvement of target detection obtained for increase in interval length.

By intentionally creating a frequency interrupt zone between the end of one transmission interval and the beginning of the next contiguous transmission interval, a corresponding frequency interrupt will be detectable in any return echoes from targets. This permits proper resolution of the range/Doppler ambiguity that was previously discussed in conjunction with FIG. 1A. Stationary targets will reflect the same frequency that was transmitted, whereas moving targets will add (for closing or approaching targets with respect to the acoustic sonar detector) or subtract (for receding, separating or opening targets with respect to the acoustic sonar detector) a Doppler frequency to the transmitted frequency, respectively, which causes a corresponding shift in the frequency of the target echo return with respect to the echo return from a stationary target as previously discussed in conjunction with FIG. 1B.

Figure 3:
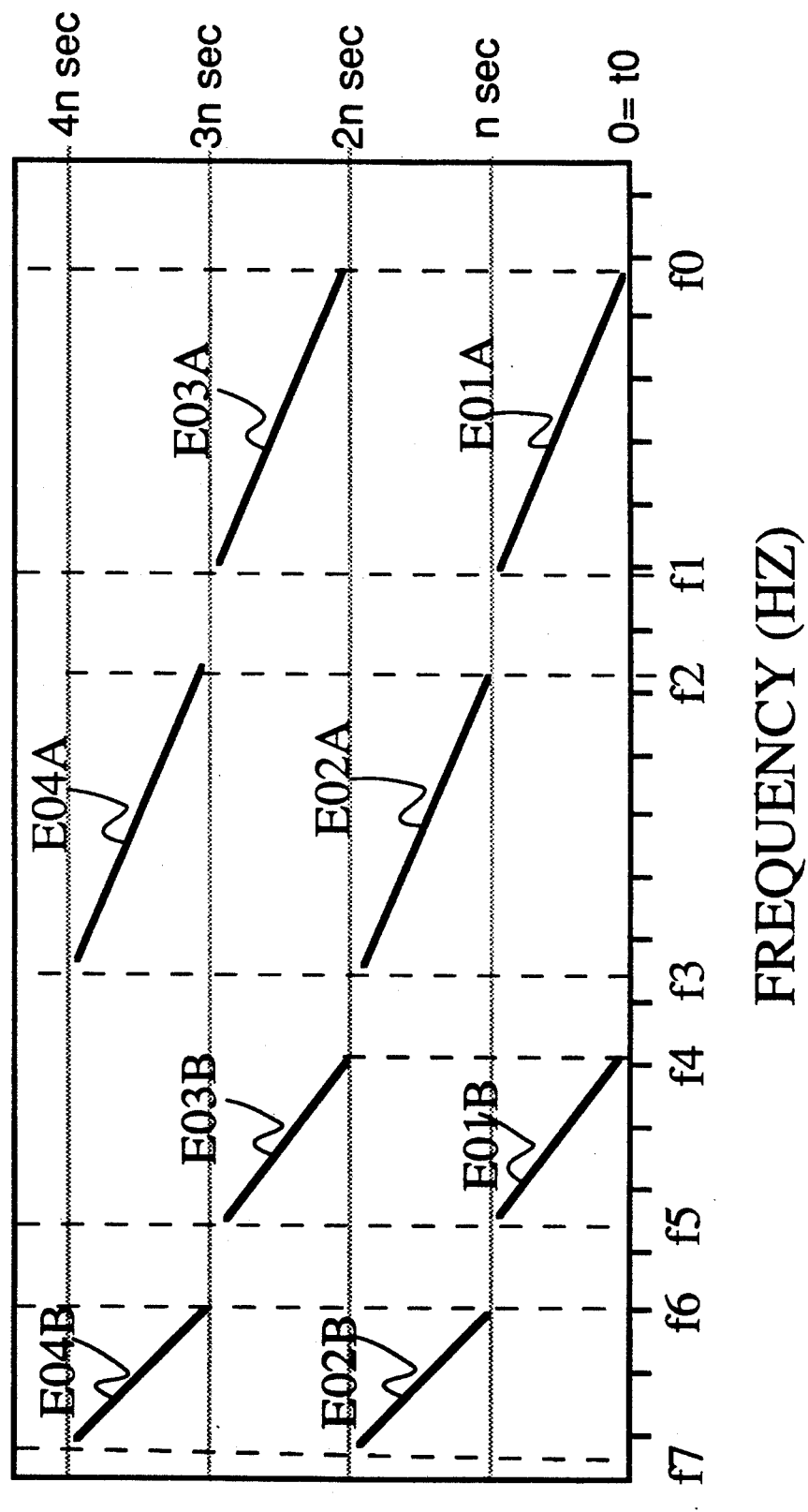
FIG. 3 is a diagram of another frequency interrupt continuous transmit waveform in accordance with the present invention.

Although the waveforms of FIG. 1 of the previously referenced deRoos et al article appear to have the same general shape as those of the present invention as shown in FIG. 3 of this document, there are significant differences between them. The waveform of FIG. 1 of the deRoos article is transmitted over an entire uniform pulse repetition period T, and reset at the end of such period to begin at the same frequency and modulation rate as the previous pulse repetition period for a next pulse repetition period T. Further, the waveforms described in deRoos et al are processed using classical active match filter techniques. In accordance with the present invention, return echoes are processed using passive frequency domain signal processing, while performance gains are achieved through non-coherent long term integration as explained in conjunction with FIGS. 4B, 4C, 4D and 5.

Referring to FIG. 3, a diagram of another frequency interrupt continuous transmit waveform in accordance with the present invention is shown.

In each time interval, there is a portion of an output waveform from each of two different waveforms. Output waveform $E_{onA}$ includes segments $E_{o1A}$, $E_{o2A}$, $E_{o3A}$ and $E_{o4A}$, with segment $E_{o3A}$ corresponding to segment $E_{o1A}$, and segment $E_{o4A}$ corresponding to segment $E_{o2A}$ but at a later time. Likewise output waveform EonB includes segments $E_{o1B}$, $E_{o2B}$, $E_{o3B}$ and $E_{o4B}$, with segment $E_{o3B}$ corresponding to segment $E_{o1B}$, and segment $E_{o4B}$ corresponding to segment $E_{o2B}$ but at a later time. Thus, waveforms $E_{onA}$ and $E_{onB}$ are shown respectively repeating after a time interval of $2^n$ seconds.

The interval $t=o$ to $t=n$ includes segments $E_{o1A}$ and $E_{o1B}$. It is noted that neither the starting nor the ending frequencies, nor the modulation rate, that is, the change in frequency per unit time as represented by the slope of the segment in FIG. 3, is the same for segments within the same time interval. The parameters of starting and ending frequencies, and modulation rate may be independently chosen for segments within the same time interval for ultimately providing more and/or different information with respect to each other regarding the transmission environment. Return echoes from the transmitted waveforms of FIG. 3 may be beneficially processed in accordance with the present invention because of the passive frequency domain signal processing that may be employed. Further, the number of waveform segments per time interval is not limited to two, but may be greater as desired.

Figure 4A:
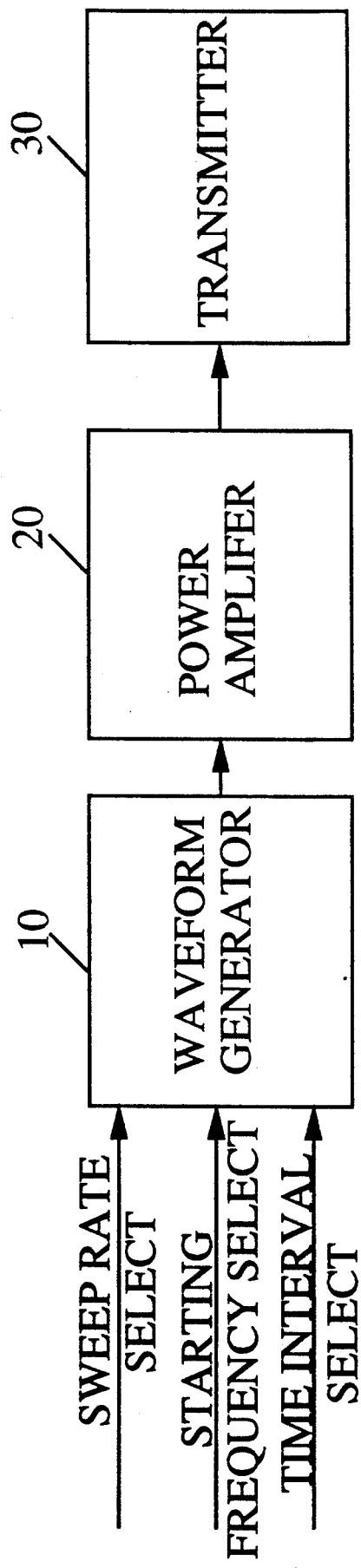
FIG. 4A is a block diagram of a frequency interrupt continuous transmit generation system in accordance with the present invention.

Referring to FIG. 4A, a block diagram of a frequency interrupt continuous transmit generation system for generating a transmittable acoustic energy waveform in accordance with the present invention is shown. Such apparatus includes waveform generator means 10, power amplifier means 20, having an input connected to the output of waveform generator 10, and transmitter means 30, having an input connected to the output of power amplifier 20.

Respective inputs of waveform generator 10 are for receiving control signals including a sweep rate select signal, a starting frequency select signal and a time interval select signal. Waveform generator 10 produces a drive signal of a predetermined magnitude whose contour or envelope is of the general form and frequency of the desired acoustical wave of energy that is to be transmitted. The drive signal is available at the output of generator 10 and is supplied to power amplifier 20. Power amplifier 20 amplifies the drive signal received from waveform generator 10 without substantially distorting or materially affecting its contour and frequency for forming an amplified drive signal that is available at its output and is provided to transmitter 30. Transmitter 30 may include a transducer or plurality of transducers, such as may be arranged in an array, for producing acoustical energy that may ultimately be coupled into the transmitting medium wherein the acoustical energy has a contour and frequency substantially the same as, or similar to, the contour of the drive signal available from waveform generator 10. The acoustic energy from transmitter 30 may be coupled into the transmitting medium, such as water, as is known in the art. Further, waveform generator 10, power amplifier 20 and transformer 30 may include conventional equipment as is known in the art. Further, waveform generator 10, power amplifier 20 and transmitter 30 may be used for generating multiple concurrent signals such as shown in FIG. 3.

The shape of, or contour of, and frequency of the drive signal available from waveform generator 10 is determined by waveform generator 10 in response to the control signals that are supplied thereto. The sweep rate select signal determines the modulation rate or change in frequency per unit of time, which may be zero as shown in FIG. 2A. The starting frequency select signal indicates the starting frequency of the ultimate acoustic energy signal at the beginning of a time interval of acoustic energy transmission. The time interval select signal designates the length of the current time interval for acoustic energy transmission. The control signal inputs to waveform generator 10 may also provide information for establishing the parameters of multiple concurrent output waveforms such as shown in FIG. 3.

The control signal inputs to waveform generator 10 may be manually selected to adapt the transmitted acoustic energy contour and frequency for optimal performance in a constant environment, or in a changing environment, based on an operator's perception and interpretation of echo returns. Alternatively, one or more control signals supplied to waveform generator 10 may be preprogrammed to provide a prescribed pattern of acoustic energy transmission. For example, the starting frequency select signal may be determined by a random or pseudo-random generator for selecting time interval starting frequencies within a predetermined bandwidth and/or the sweep rate signal determined by preprogrammed sweep rate signal schedules.

Figure 4B:
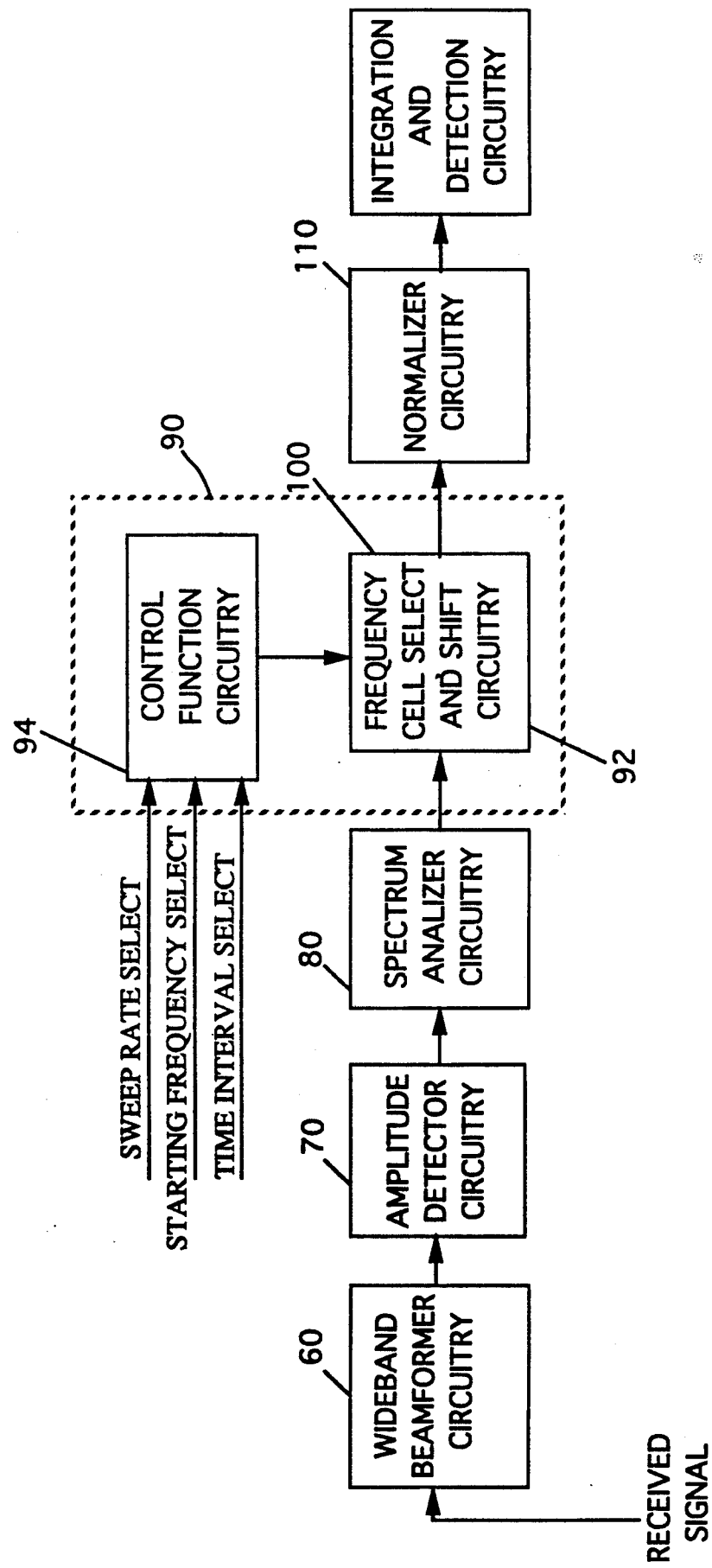
FIG. 4B is a block diagram of a signal processing system in accordance with the present invention.

Referring to FIG. 4B, a block diagram of a signal processing system in accordance with the present invention is shown.

The signal processing system includes wideband beamformer circuitry 60, spectrum analyzer circuitry 70, amplitude detector circuitry 80, frequency cell format circuitry 90, normalizer circuitry 100 and integration and detection circuitry 110 serially connected in the order recited.

Wideband beamformer circuitry 60 has a received signal supplied to its input that is indicative of an acoustic signal sensed by a sonar system detector, such as a hydrophone, which may be part of an array of such detectors. Wideband beamformer circuitry 60 forms narrow beams in bearing space to provide accurate bearing estimation in response to the received signal or echo return, as is known in the art.

The output signal from wideband beamformer circuitry 60 is provided to spectrum analyzer circuitry 70. Spectrum analyzer 70 determines the frequency-energy distribution of the signal received from beamformer circuitry 60. The size of the discrete frequency intervals, or cells, which determines the overall resolution of the spectrum analyzer circuitry, may be predeterminedly selected. Generally it is desirable to have the discrete frequency cells be equal to the magnitude of the modulation rate. That is, if the modulation rate is one Hertz per second, then each frequency cell should be one Hertz wide.

The output from spectrum analyzer 70 is an energy spectrum signal indicative of the magnitude of the energy for each frequency cell of interest. Amplitude detection circuitry determines in response to the energy spectrum signal received from analyzer 70, whether the energy level for each cell is greater than a predetermined threshold.

Frequency cell format circuitry 90 receives a frequency/time data signal from the output of amplitude detector 80 that indicates which frequency cells were determined to have an energy level exceeding the predetermined threshold. Frequency cell format circuitry 90 performs a deramping process for reformatting the frequency cell data received from amplitude detector 80. The deramping process is explained more fully in conjunction with FIGS. 4C, 4D and 5, and an example of how information resulting from such deramping may be beneficially displayed to an operator in accordance with the present invention is shown and explained in conjunction with FIGS. 6A and 6B. Normalizer circuitry 100 supplies a signal, which is available at its output and which is indicative of the frequency cells having frequency energy levels exceeding the predetermined threshold, to integration and detection circuitry 110 which may be of a conventional type for passive sonar signal processing.

Figure 4C:
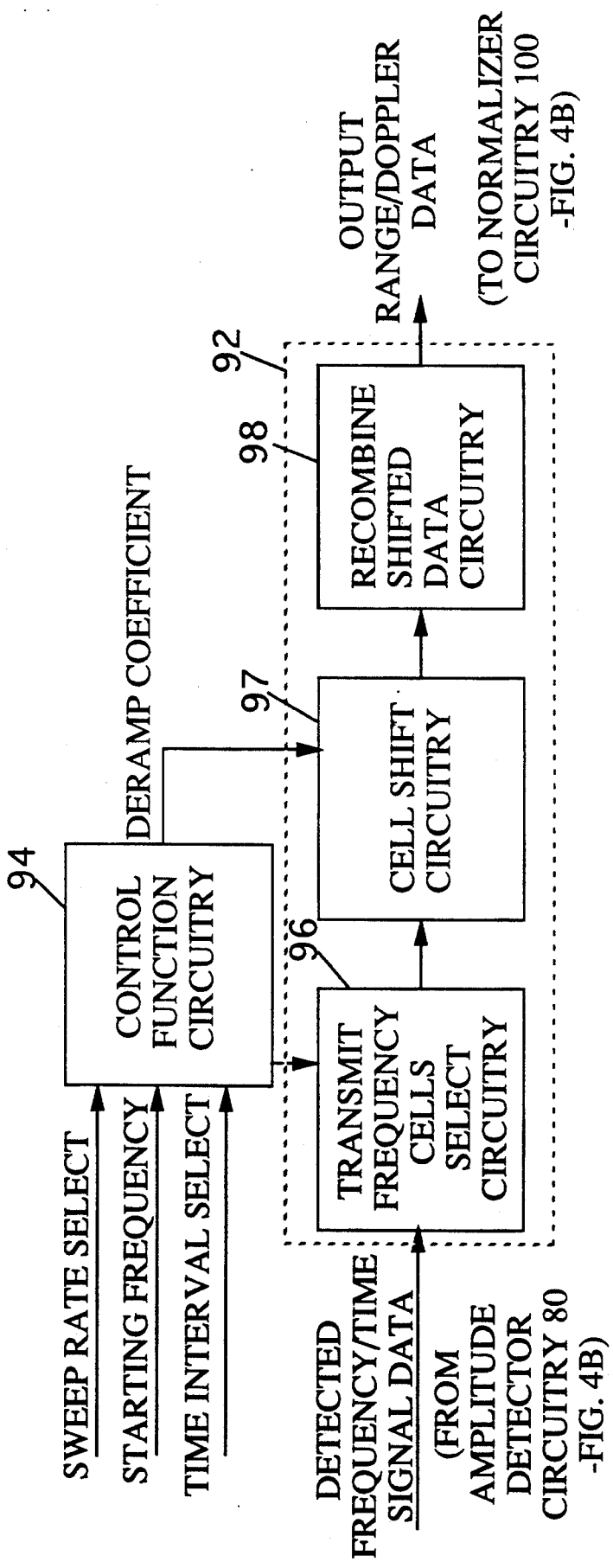
FIG. 4C is a block diagram of the frequency cell format circuitry of FIG. 4B.

Referring to FIG. 4C, a block diagram of the frequency format circuitry is shown.

Frequency cell format circuitry 90 includes control function circuitry 94 having respective inputs for receiving the sweep rate, starting frequency and time interval signals, and frequency cell select and shift circuitry 92. Frequency cell select and shift circuitry 92 includes transmit frequency cells select circuitry 96 having an input constituting an input of frequency cell select and shift circuitry 92 for receiving the detected frequency/time data signal from amplitude detector 80 (FIG. 4B) and an input for receiving a sweep rate and duration signal from control function circuitry 94 for indicating the sweep rate and the duration of the sweep.

Frequency cell select and shift circuitry 92 further includes cell shift circuitry 97 having an input connected to the output of transmit frequency cells select circuitry 96 for receiving the selected transmit cells signal and another input connected to an output of control function circuitry 94 for receiving the deramp coefficient signal, and recombine shifted data circuitry 98 having an input connected to the output of cell shift circuitry 97 for receiving the shifted cell signal and an output which constitutes the output of frequency cell select and shift circuitry 90 for supplying the range/-Doppler data signal to normalizer circuitry 100 (FIG. 4B).

Transmit frequency cells select circuitry 96 determines in response to the sweep rate and duration signal received from control function circuitry 94 which frequencies out of all possible frequencies examined by amplitude detector circuitry 80 (FIG. 4B) will be subjected to further processing. For example, the initial acoustic sensor, such as a hydrophone, may have a relatively broad bandwidth that encompasses the bandwidth of interest (typically the transmitted bandwidth plus the expected Doppler shift for the present invention for ensuring that the frequencies of interest are detected. Of course, if the sensor is part of an existing system its bandwidth may be substantially greater). The combination of spectrum analyzer 70 and amplitude detector circuitry 80 (FIG. 4B) may further limit the bandwidth, providing that the bandwidth of interest is accommodated.

Cell shift circuitry 97 provides the amount of shift, demodulation, or deramping, necessary to remove the effects of the modulation of the transmitted signal from the selected detected signal received from transmit frequency cells select circuitry 96, in response to the deramp coefficient, which is proportional to the sweep rate and a constant for a given sweep rate to provide a signal indicative of the Doppler frequency and range of the contact which created the return echo. For example, if the sweep rate of the transmitted waveform is 1 Hz/second, then an initial predetermined frequency $f_o + 1$ Hz will be corrected by a factor of 1 times 1 second, a signal at $f_o + 2$ Hz will be corrected by a factor of 2 times 1 second, etc. The results of which are discussed in more detail in conjunction with FIG. 4D.

Recombine shifted data circuitry 98 rearranges the shifted data received from cell shift circuitry 97 and arranges it in logical row/column format indicative of range versus Doppler frequency. The range/Doppler data is supplied to normalizer circuitry 100 (FIG. 4B) where it may be processed as conventional passive data.

Control function circuitry 94 may include a general purpose microprocessor and keypad for enabling operator input of the control signals.

Figure 4D:
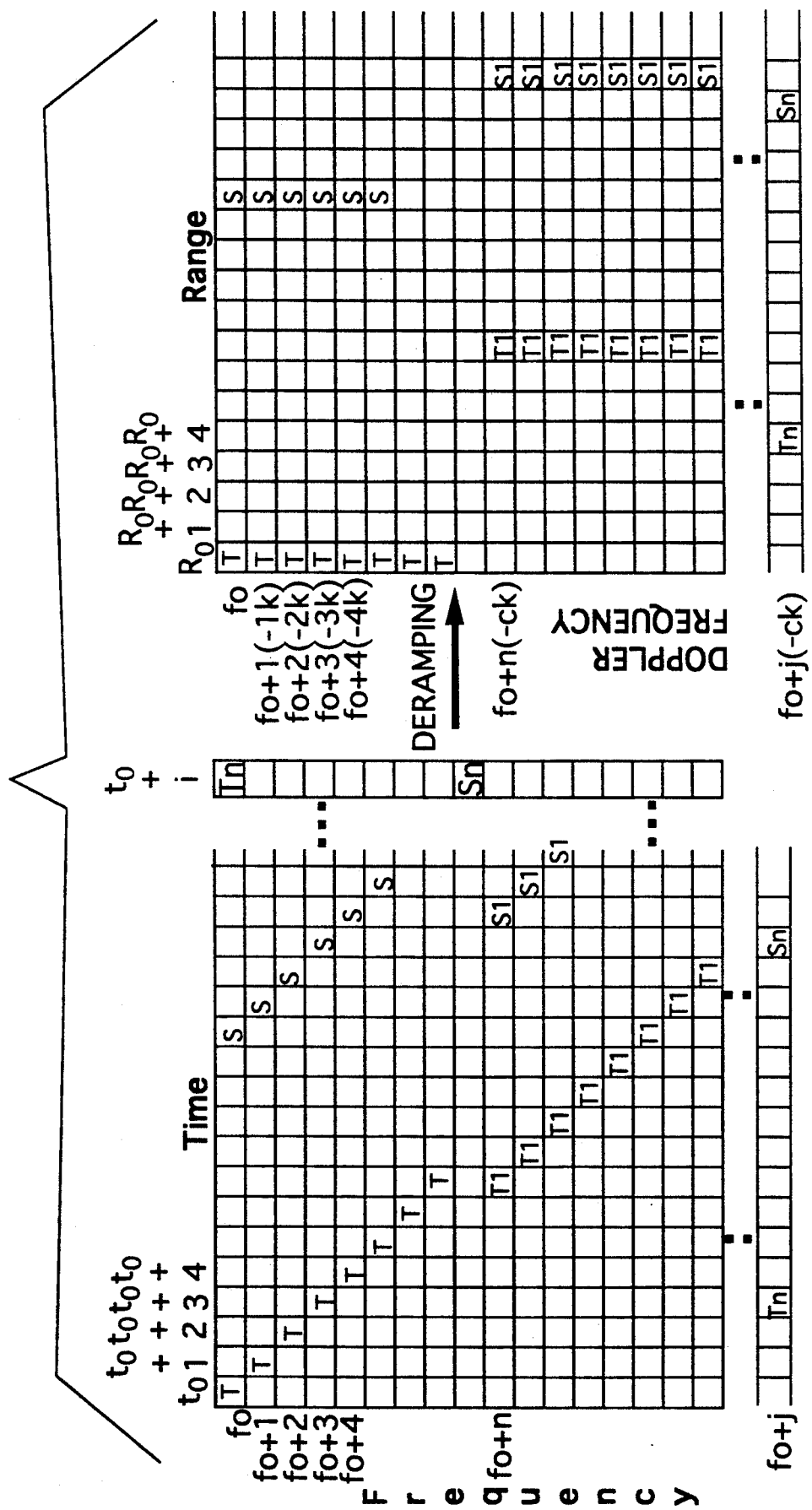
FIG. 4D is a schematic diagram useful for explaining signal processing in accordance with the present invention.

Referring to FIG. 4D, a representative grid of frequency cells, or boxes, versus time or range that is useful for explaining signal processing in accordance with the present invention is shown. It is noted that range is related to the time difference between the time of transmission and the time of reception of a response to the transmission, which time difference is a function of the speed of the acoustic signal in the transmitting medium.

The left hand grid of FIG. 4D represents cells that are identifiable by a unique pair of absolute frequency and time designators and may be used to present detected signal data in raw, or unprocessed, form. Representative signals are shown. Own system transmitted signals having a modulation rate greater than zero are represented by T and $T_1$, while corresponding return echoes from potential targets are represented by S and $S_1$, respectively. The slanted representation with respect to the time and frequency axes shows the effect of transmission frequency modulation at a rate greater than zero. The transmission frequency interrupt is recognized between the rightmost T and the leftmost $T_1$ in the vertical or frequency direction of the left hand grid.

The right hand grid of FIG. 4D represents cells that are identifiable by a unique pair of Doppler frequency and range designators and may be used to present processed Doppler frequency/time data in accordance with the present invention. Representative signals that may be obtained from the signals of the left hand grid by processing in accordance with the present invention are shown. The same designation is used for corresponding signals. It is noted that the deramping, or demodulating, in accordance with the present invention, removes the effect of the modulation rate on the detected signals.

For example, in the left hand grid the sweep rate may be 1 Hz/second. Thus, each box or cell represents one second along the time axis and one Hz along the frequency axis. Own transmission T are shown having a modulation rate of 1 Hz/second. That is, the rightmost transmission T occurs seven (7) seconds later and is at a frequency 7 Hz higher than transmission T occurring at $(t_o, f_o)$.

Transmit frequency cells select circuitry 96 (FIG. 4C) will select the band of frequency cells including transmissions T plus an additional contiguous band of frequencies which will potentially include any expected Doppler modified frequencies. Of course, the echo returns S in response to transmissions T will lie within the selected band and the additional contiguous band if the contiguous band is properly chosen. Cell shift circuitry 97 (FIG. 4C) shifts the detected signals in the frequency band selected so that the resulting signals correspond to a range/Doppler frequency format. The constant K indicated along the frequency axis is the deramp coefficient, or correction factor, available from control function circuitry 94. The deramp coefficient is the magnitude of the sweep rate when the sweep rate is represented in Hz/second. Thus for sweep rates of ½, 1 and 2 Hz/second, the corresponding coefficients are ½, 1 and 2, respectively. Shifting or deramping of transmission T of the left grid of FIG. 4D in response to the corresponding deramp coefficient and relative frequency results in a vertical display for transmissions T on the right grid of FIG. 4D because the shifting operation has modulation sweep rate on the signal. Other transmissions $T_1$ and contacts S and $S_1$ may be similarly demodulated.

Figure 5:
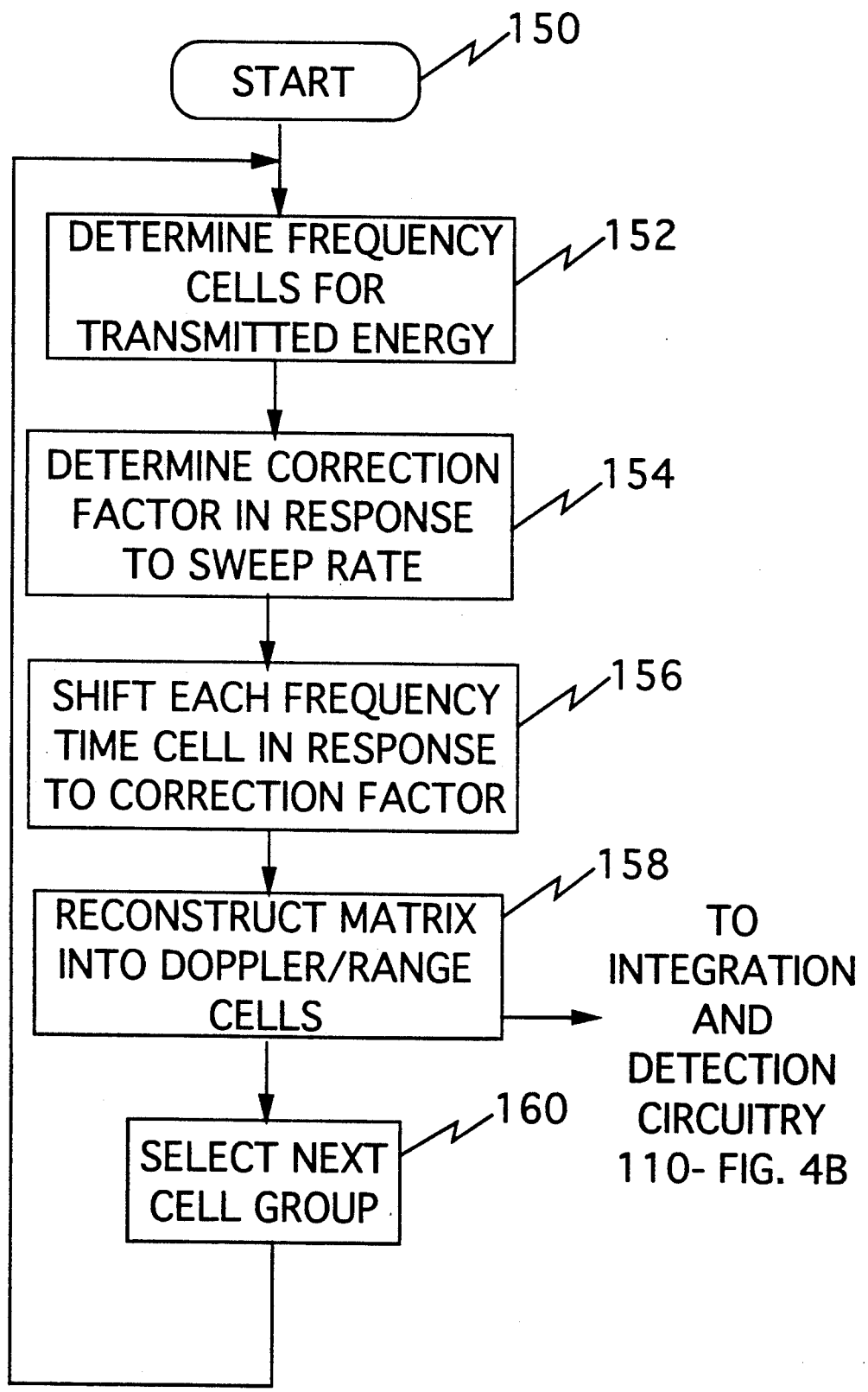
FIG. 5 is a flow diagram of a scheme for processing signals in accordance with the present invention.

Referring to FIG. 5, a flow diagram of a scheme for processing signals in accordance with the present invention is shown.

The process performed by the apparatus illustrated in FIG. 4C may be implemented and controlled by a general purpose microcomputer programmed in accordance with the flow diagram of FIG. 5.

The process starts at step 150 and proceeds to execute step 152 to determine the appropriate frequency cells for the transmitted energy plus any expected Doppler shift whose data will be further manipulated. Performance of step 154 determines the correction factor, or deramp coefficient, in response to the sweep rate of the transmitted energy. Execution of step 156 shifts each frequency time cell in response to the correction factor for demodulating the detected signal and execution of step 158 reconstructs the shifted frequency time cells into a matrix of Doppler frequency/range cells. The resulting matrix may be provided to integration and detection circuitry 110 (FIG. 4B) for further processing. Performance of step 160 selects a next cell group for processing and then step 152 is repeated.

Figure 6B:
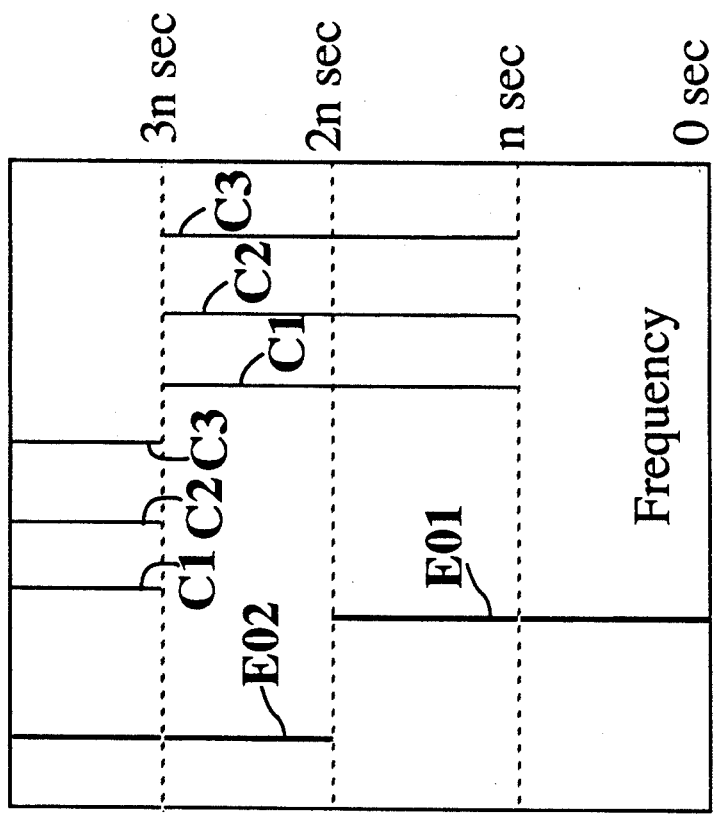
FIG. 6B is a diagram of the information of FIG. 6A presented in a different format after processing in accordance with the present invention.
Figure 6A:
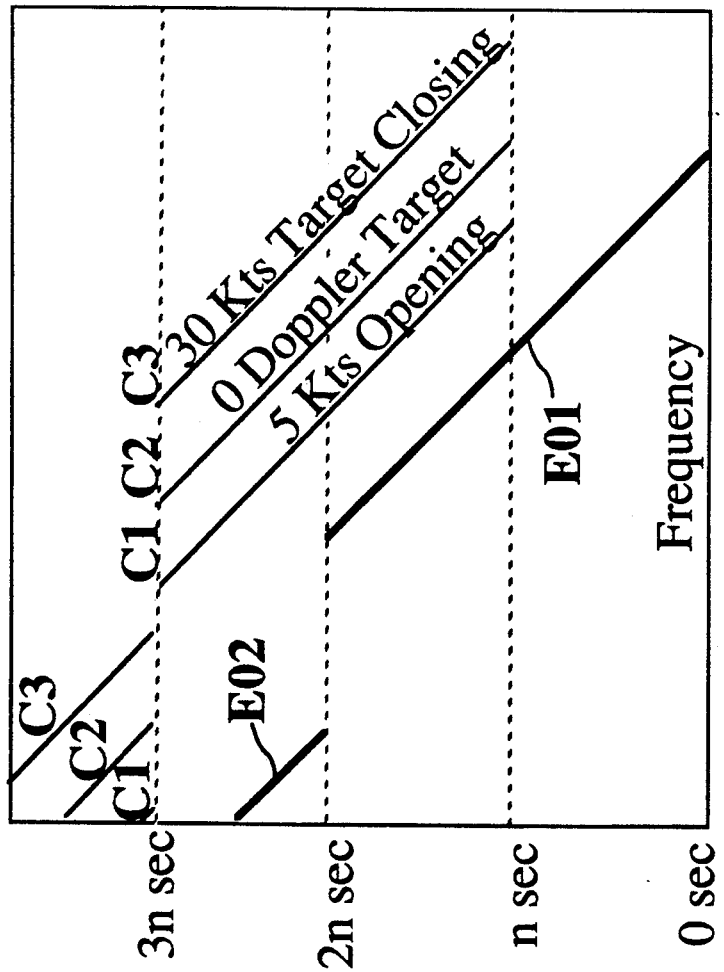
FIG. 6A is a diagram of a representative frequency interrupt continuous transmit waveform and resulting echo returns from three contacts presenting different Doppler profiles in accordance with the present invention.

Referring to FIGS. 6A and 6B, representative transmitted and received waveforms in the transmitting medium, and corresponding ones after processing as may be presented on a display for an operator, respectively, in accordance with the present invention are shown.

With reference in particular to FIG. 6A and waveforms as they may appear in the transmitting medium, a transmitted wave of acoustic energy $E_{o1}$ and $E_{o2}$, which is a portion of an FICT waveform in accordance with the present invention, impinges on three contacts whose return echoes $C_1$, $C_2$ and $C_3$ represent a 5 Kt opening target, a stationary or zero Doppler target, and a 30 Kt closing target, respectively. Due to the frequency modulation component of the waveforms, that is, change in frequency with respect to time, transmitted energy wave $E_{o1}$ and $E_{o2}$ and contact echoes $C_1$, $C_2$ and $C_3$ appear oblique with respect to each of the mutually perpendicular time and frequency axes.

With reference to FIG. 6B and waveforms corresponding to those of FIG. 6A as they may be presented for display to an operator, processing of received contact echoes $C_1$, $C_2$ and $C_3$ and rearrangement of the presentation of transmitted wave $E_{o1}$ in accordance with the present invention results in "deramping" or elimination of the displayed dependence on the modulation rate before presenting the representative frequencies of waveforms $E_{o1}$, $C_1$, $C_2$ and $C_3$ so that they may be presented as substantially vertical displays, a format analogous to that typically used in passive array sonar systems.

Figure 7:
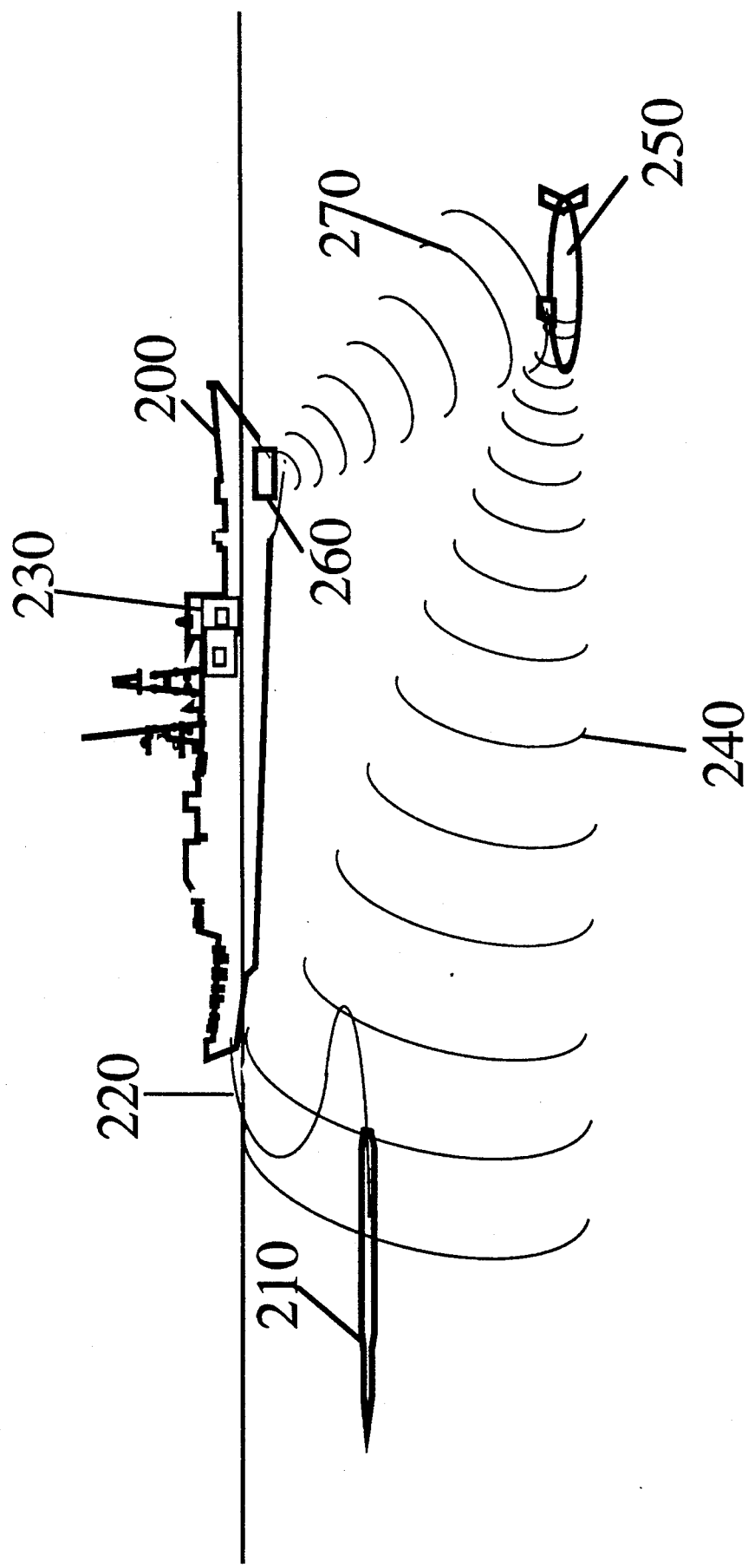
FIG. 7 is a schematic diagram of an existing passive towed array sonar system that is modified in accordance with the present invention.

The present invention may be used in a stand-alone sonar system. However, existing passive sonar systems may be readily modified or retrofitted to incorporate the present invention, while still maintaining their previous passive operational functions. One such arrangement is illustrated in FIG. 7.

A surface ship 200 is shown towing an array 210 of acoustic sensors, such as hydrophones, by a cable 220. Cable 220 also includes electronic transmission means, such as conductive wires, for supplying electronic signals from array 210 to ship 200 for processing by processor and display means 230. In the passive mode, acoustic noise 240 that is generated by a target 250, such as a submarine, is received by array 210 and converted to electrical signals for ultimate processing by shipboard electronics 230.

In accordance with the present invention, ship 200 may be modified to include radiating means 260, such as an array of transducers, which may be part of transmitter 30 (FIG. 4A) for emitting or radiating a continuous acoustic wave 270 of energy that may be modulated as previously described in accordance with the present invention. A portion of FICT wave 270 may strike target 250 and be reflected from it. A part of the modulated continuous wave 270 that is reflected from target 250 may follow a similar path as shown by noise 240 to be intercepted and detected by array 210. Further, inasmuch as array 210 is not aware of how the acoustic energy it receives was generated, for example, either self-generated target noise or own-ship generated and reflected acoustic energy, both types may be processed as if originating from the target for determining bearing and range to the target.

A benefit of modifying existing passive sonar systems in accordance with the present invention is that such modifications are relatively inexpensive as compared to designing, developing and implementing a new sonar system, and may generally be designed and retrofitted to the existing system in a shorter time frame than that necessary for designing and producing a new stand-alone system that performs substantially the same functions.

Typical modifications to an existing passive sonar system for achieving an active frequency interrupt continuous transmit wave sonar system in accordance with the present invention include adding transducers for generating acoustical waves of energy that are coupled into the transmitting medium, adding electronics or modifying existing electronics that may be available for other active sonars for generating waveforms for modulating the generated acoustic energy wave in accordance with the present invention, and modifying and/or adding shipboard electronics for processing received signals in accordance with the present invention.

Another benefit of modifying an existing passive sonar system to accommodate the current invention is that the processed information from the combination of the passive and active systems may be simultaneously presented on a video display to an operator for increasing the information available to the operator about a potential target. Inasmuch as in accordance with the present invention the passive and active information about the target is derived from the same array and associated sensors, and may be analogously processed, there are no parallax, range ambiguities, frequency cell difference compensations or other corrections which must be made prior to presenting the active and passive sonar target information on the display.

Thus has been illustrated and described a continuous transmit frequency modulated sonar system wherein range ambiguities may be avoided and/or properly resolved. Also shown and described is a frequency interrupt continuous transmit active sonar in combination with a towed array passive sonar system for increasing target detection capabilities, as well as a modification or retrofit to an existing towed array passive sonar system for increasing its target detection capabilities.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:

1. In a time domain continuous transmit sonar system, a method for generating a time domain continuous transmitted waveform of energy for resolving range/Doppler ambiguity, comprising:

selecting a first frequency for the waveform at the beginning of a first time interval; and selecting a second frequency for the waveform at the beginning of a second time interval, wherein the beginning of the second time interval corresponds in time to the end of the first time interval and further wherein the second frequency is different from the first frequency, so that the waveform is discontinuous in the frequency domain at the end of the first and beginning of the second time interval, wherein examination of echo returns from an object in response to the transmitted waveform from both the first and second time interval will permit proper resolution of the range and Doppler shift frequency caused by the object without range/Doppler ambiguity.

2. The method as in claim 1, further including the steps of:
modulating the waveform at a first predetermined rate of change of frequency during the first time interval; and
modulating the waveform at a second predetermined rate of change of frequency during the second time interval.

3. The method as in claim 2, wherein the first and second predetermined rate of change are equal.

4. The method as in claim 2, wherein the first and second predetermined rate of change are equal to zero.

5. In combination, an active and passive sonar system, comprising:
transmitter means for coupling time domain continuous acoustic energy into a transmitting medium;
detection means for sensing at least a portion of the acoustic energy in the transmitting medium; and
processing means for processing information indicative of the second acoustic energy;
wherein the transmission means is retrofitted to a passive sonar system including the detection means and the processing means, the combination for increasing the target detection capability of the passive sonar system.

6. A waveform for modulating a continuous transmit acoustic signal for use in a sonar system, comprising:
a first portion having a first starting frequency at the beginning of a first time interval and a first ending frequency at the end of the first time interval;
a second portion having a second starting frequency at the beginning of a second time interval and a second ending frequency at the end of the second time interval,
wherein the beginning of the second time interval is contiguous with the end of the first time interval and further wherein the second starting frequency is different from the first starting and the first ending frequency.

7. The waveform as in claim 6, wherein the first interval includes a third portion having a third starting frequency at the beginning of the first interval and a third ending frequency at the end of the first time interval and wherein the second interval includes a fourth portion having a fourth starting frequency at the beginning of the second interval and a fourth ending frequency at the end of the second time interval, wherein the third ending frequency is different from the fourth starting frequency.

8. In a time domain continuous transmit sonar system, apparatus for processing detected energy, wherein the detected energy includes a modulation frequency component in response to a transmitted signal, comprising:
spectrum analyzer means for providing a frequency energy distribution signal in response to the detected energy;
amplitude detector means coupled to the spectrum analyzer means, the detector means for providing a detection signal indicative of the energy of predetermined frequency cells that is greater than a predetermined threshold; and
frequency cell format means coupled to the amplitude detector means, the cell format means for removing the modulation frequency component from the frequency cells having energy that is greater than the predetermined threshold.

9. The apparatus as in claim 8, further including integration and detection means coupled to the frequency cell format means, the integration and detection means for determining presence of a potential contact in response to frequency cells having had the modulation frequency component removed.

10. The apparatus as in claim 9, further including display means coupled to the frequency cell format means, the display means for presenting to an observer the frequency cells having had the modulation frequency component removed.

11. A method for presenting acoustic data that is detected in response to transmitted modulated acoustic energy to an observer, comprising:
determining frequency cells for the transmitted energy;
determining a correction factor in response to the modulation sweep rate of the transmitted energy;
shifting each frequency time cell in response to the correction factor;
reconstructing a matrix of the shifted frequency time cells into Doppler/range cells; and
providing the matrix of Doppler/range cells for display.

12. The waveform as in claim 7, wherein each of the first, second, third and fourth portion includes a respective independent predetermined modulation rate, the modulation rate for the first and third portion being difference from each other and the modulation rate for the second and fourth portion being different from each other.

13. The apparatus as in claim 8, wherein the modulation frequency component is equal to zero.

14. The method as in claim 11, further including providing acoustic data derived from a passive detection system for display, so that active and passive information maybe simultaneously presented to an operator.

15. The method as in claim 14, further including detecting acoustic data in response to transmitted modulated acoustic energy with the passive detection system so that parallax between a presentation of the active and passive information is avoided.

* * * * *